(12) United States Patent
Lee et al.

(10) Patent No.: US 9,283,928 B2
(45) Date of Patent: Mar. 15, 2016

(54) LOAD LIMITER

(75) Inventors: Kyung Sang Lee, Anyang-si (KR); Yo Sun Hong, Anyang-si (KR); Jong Keun Lee, Seongnam-si (KR); Kwang Mo Koo, Icheon-si (KR); Jung Woo Ha, Osan-si (KR)

(73) Assignee: WOOSHIN SAFETY SYSTEMS CO., LTD. (KR)

( * ) Notice: Subject to any disclaimer, the term of this patent is extended or adjusted under 35 U.S.C. 154(b) by 97 days.

(21) Appl. No.: 14/000,719

(22) PCT Filed: Jan. 30, 2012

(86) PCT No.: PCT/KR2012/000653
§ 371 (c)(1),
(2), (4) Date: Aug. 21, 2013

(87) PCT Pub. No.: WO2012/115358
PCT Pub. Date: Aug. 30, 2012

(65) Prior Publication Data
US 2013/0327875 A1    Dec. 12, 2013

(30) Foreign Application Priority Data
Feb. 21, 2011 (KR) .................. 10-2011-0015168

(51) Int. Cl.
*B60R 22/40* (2006.01)
*B60R 22/34* (2006.01)
(52) U.S. Cl.
CPC .......... *B60R 22/341* (2013.01); *B60R 22/3413* (2013.01)
(58) Field of Classification Search
CPC .................................................. B60R 22/341

USPC ................................ 242/379.1; 297/471, 472
See application file for complete search history.

(56) References Cited

U.S. PATENT DOCUMENTS 6,209,916 B1    4/2001  Smithson et al.
8,348,307 B2 *  1/2013  Moro ........................... 280/805
(Continued)

FOREIGN PATENT DOCUMENTS

JP       2002059810       2/2002
KR     1020070029271     3/2007
(Continued)

OTHER PUBLICATIONS

International Search Report—PCT/KR2012/000653 dated Sep. 24, 2012.

(Continued)

*Primary Examiner* — Sang Kim
(74) *Attorney, Agent, or Firm* — Cantor Colburn LLP

(57) ABSTRACT

Disclosed is a load limiter mounted within a cylindrical spool on which a webbing is wound to constrain a load applied to the webbing from exceeding a preset load, the load limiter including: a first torsion bar inserted into a hollow portion formed at a center of the spool and one end of which is coupled to one end of the spool; and a second torsion bar one end of which is connected to an opposite end of the first torsion bar to be inserted into the hollow portion of the spool together with the first torsion bar and an opposite end of which is coupled to a locker installed at an opposite end of the spool, wherein the torsion bar is configured such that a torsion load limit of the first torsion bar is smaller than a torsion load limit of the second torsion bar.

5 Claims, 5 Drawing Sheets

(56) References Cited

U.S. PATENT DOCUMENTS

2008/0061180 A1* 3/2008 Webber et al. ............. 242/379.1
2009/0091115 A1   4/2009 Bell et al.
2010/0117437 A1* 5/2010 Hiramatsu et al. ............ 297/472
2011/0147509 A1* 6/2011 Wang et al. .................. 242/374

FOREIGN PATENT DOCUMENTS

WO    2008060337    5/2008
WO    WO 2009045132 A1 *   4/2009   ............. B60R 22/34

OTHER PUBLICATIONS

Korean Office Action—Korean Application No. 10-2011-0015168 issued on Aug. 10, 2012 citing JP 2002-059810 and KR 10-2007-0029271.
Korean Notice of Allowance—Korean Application No. 10-2011-0015168 issued on Jun. 27, 2013 citing JP2002059810 and KR1020070029271.

* cited by examiner

LOAD LIMITER

TECHNICAL FIELD

The present invention relates to a load limiter. More particularly, the present invention relates to a load limiter by which a load applied to a webbing is constrained from exceeding a preset load over two steps.

BACKGROUND ART

In general, a seatbelt for constraining a passenger during a collision of a vehicle is installed in a seat of the vehicle to prevent the passenger from being injured while being thrust toward the front side to collide with a vehicle body or an object during the collision of the vehicle.

However, when a vehicle collides, the body of a passenger leans to the front side due to inertia, and a webbing of the seatbelt presses the chest of the passenger strongly.

Meanwhile, when a fastening force of a webbing is made strong to firmly fix a passenger, a passenger is constrained from being thrust toward the front side to collide with the body of a vehicle or an object, making it possible to reduce injury to the passenger. However, the webbing may press the chest of the passenger strongly, causing injury to the chest or stomach of the passenger.

Thus, in recent years, a load limiter for limiting a load between a passenger and a webbing so that the load cannot exceed a preset load range has been installed in seatbelts, whereby a pressing force applied to the chest of a passenger due to a strong fastening force of a webbing can be lessened.

However, the currently developed load limiter is configured to limit a load applied between a passenger and a webbing to a high load range in an initial step where the load limiter starts to be operated, and to lower a load range in the following step.

The fact that a load applied to the chest of a passenger in the initial step of the operation of the load limiter is higher than that of the following step means that a degree by which a pressing force applied to the chest of a passenger is weak at the initial step of the operation of the load limiter, i.e. at the beginning when the vehicle collides and an effect of the load limiter is weak at the initial step of the collision of the vehicle. Thus, demand is increasing for development of a technology for loosening a webbing relatively easily by making a load applied between a passenger and the webbing small at an initial step of an operation of a load limiter so that a pressing force applied to the chest of the passenger can be lessened at an initial step of collision of a vehicle, and then increasing a load applied between the passenger and the webbing so that the webbing cannot be easily released before the head of the passenger collides with a structure of the vehicle disposed on the front side of the passenger.

DISCLOSURE OF INVENTION

Technical Problem

Accordingly, the present invention has been made to solve the above-mentioned problems occurring in the prior art, and an aspect of the present invention provides a load limiter which minimizes an injury to a passenger when a vehicle collides by setting an initial load applied between the passenger and a webbing to be lower or higher than an operation load applied later.

The technical objects to be achieved by the present invention are not limited to the above-mentioned object, and the unmentioned other technical objects will be clearly understood by those skilled in the art to which the present invention pertains from the following description.

Solution to Problem

According to an exemplary embodiment, there is provided a load limiter mounted within a cylindrical spool on which a webbing is wound to constrain a load applied to the webbing from exceeding a preset load, the load limiter including: a first torsion bar inserted into a hollow portion formed at a center of the spool and one end of which is coupled to one end of the spool; and a second torsion bar one end of which is connected to an opposite end of the first torsion bar to be inserted into the hollow portion of the spool together with the first torsion bar and an opposite end of which is coupled to a locker installed at an opposite end of the spool, wherein the torsion bar is configured such that a torsion load limit of the first torsion bar is smaller than a torsion load limit of the second torsion bar.

Here, when the one end of the spool is rotated as the webbing continues to be extracted and the opposite end of the spool is fixed due to a locking operation of the locker, both a torsion load of the first torsion bar and a torsion load of the second torsion bar may increase as the load applied to the webbing increases. Further, the increasing load applied to the webbing may be constrained from exceeding the preset load through two steps as the second torsion bar reaches a torsion load limit to be twisted after the first torsion bar first reaches the torsion load limit to be twisted.

Then, the two steps may include: a first step of constraining the load applied to the webbing from exceeding a first set load as the first torsion bar reaches the torsion load limit to be twisted; and a second step of constraining the load applied to the webbing from exceeding a second set load higher than the first set load as the second torsion bar reaches the torsion load limit after the first step is completed.

Meanwhile, the load limiter may further include: an adapter acting as a cylindrical connection medium body for connecting an opposite end of the first torsion bar and one end of the second torsion bar and having a catching boss protruding in a section on an outer peripheral surface thereof; and a stopper mounted to an inner peripheral surface of the spool and, when the one end of the spool is rotated as the webbing continues to be extracted and the opposite end of the spool is fixed due to a locking operation of the locker, rotated along an outer peripheral surface of the adapter until one end thereof bent toward the outer peripheral surface of the adapter is caught by the catching boss.

Here, the one end of the stopper may be disposed on one side of the catching boss before the one end of the spool is rotated as the webbing continues to be extracted and the opposite end of the spool is fixed due to a locking operation of the locker, but may be rotated along an outer peripheral surface of the adapter while the first step is performed, may be disposed on a side opposite to the one side of the catching boss if the first step is completed, and may be rotated together with the adapter including the catching boss while contacting the opposite side of the catching boss.

Then, a circumferential angle by which the stopper is rotated from the one side to the opposite side of the catching boss about a central axis of the adapter along an outer peripheral surface of the adapter may be 270 to 330 degrees.

Then, the adapter may include a first recess into which the opposite end of the first torsion bar is inserted to be fixed at one side thereof, and a second recess into which the one end of the second torsion bar is inserted to be fixed at an opposite side thereof, and a catching boss formed on an outer surface thereof where the stopper is not rotated as an outer surface thereof adjacent to the one side thereof is recessed and stepped along a path along which the stopper is rotated.

Then, the first recess and the second recess may have shapes corresponding to the opposite end of the first torsion bar and the one end of the second torsion bar and has polygonal shapes having inner angles.

Meanwhile, the load limiter may further include a deformable member mounted to one surface of the locker opposite to the opposite end of the spool when an initial load of the first set load needs to be increased, wherein after the one end of the spool is rotated as the webbing continues to be extracted and the opposite end of the spool is fixed due to a locking operation of the locker, the deformable member is deformed so that a load applied to the webbing is constrained from exceeding a preset load even if the initial load of the first set load increases.

Here, the deformable member may be a C-shaped member whose one end is a fixed end mounted and fixed to one surface of the locker and whose opposite end is a free end disposed on the one surface of the locker without being fixed and relatively moved along a guide groove formed at the opposite end of the spool. Further, a bending portion formed between the one end and the opposite end of the deformable member may be deformed to be gently spread out while passing through the guide groove so that a load applied to the webbing is constrained from exceeding the preset load even if the initial load of the first set load increases.

Meanwhile, after the second torsion bar is coupled to the locker to which the deformable member is mounted and an assembly where the first torsion bar is connected to the second torsion bar through the adapter as the connection medium body, the assembly may be inserted into the hollow portion of the spool and the one end of the spool is caulked to couple the first torsion bar to the one end of the spool.

Then, the stopper may be inserted and mounted into the hollow portion of the spool in advance before the assembly is inserted into the hollow portion of the spool, or may be pre-assembled in the assembly to be inserted and mounted into the hollow portion of the spool together with the assembly.

Advantageous Effects of Invention

According to the load limiter of the present invention, two torsion bars having different torsion loads can minimize an injury to a passenger when a vehicle collides by setting an initial load applied between the passenger and a webbing to be lower or higher than an operation load after an initial load is applied.

BRIEF DESCRIPTION OF DRAWINGS

The above and other objects, features and advantages of the present invention will be more apparent from the following detailed description taken in conjunction with the accompanying drawings, in which.

MODE FOR THE INVENTION

Hereinafter, exemplary embodiments of the present invention will be described in detail with reference to the accompanying drawings. In a description of the present invention, known functions and configurations will be omitted to make the essence of the present invention clear.

Figure 1:
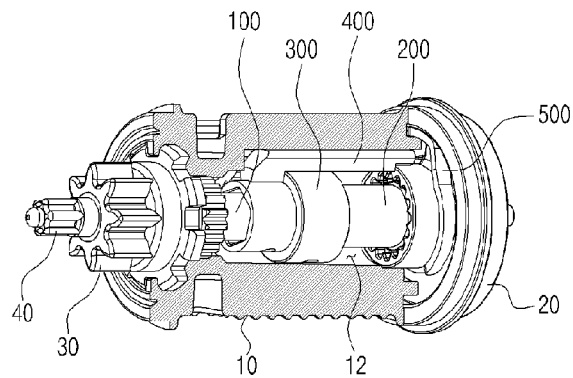
FIG. 1 is a partially-cutaway perspective view illustrating a load limiter according to an embodiment of the present invention.
Figure 2:
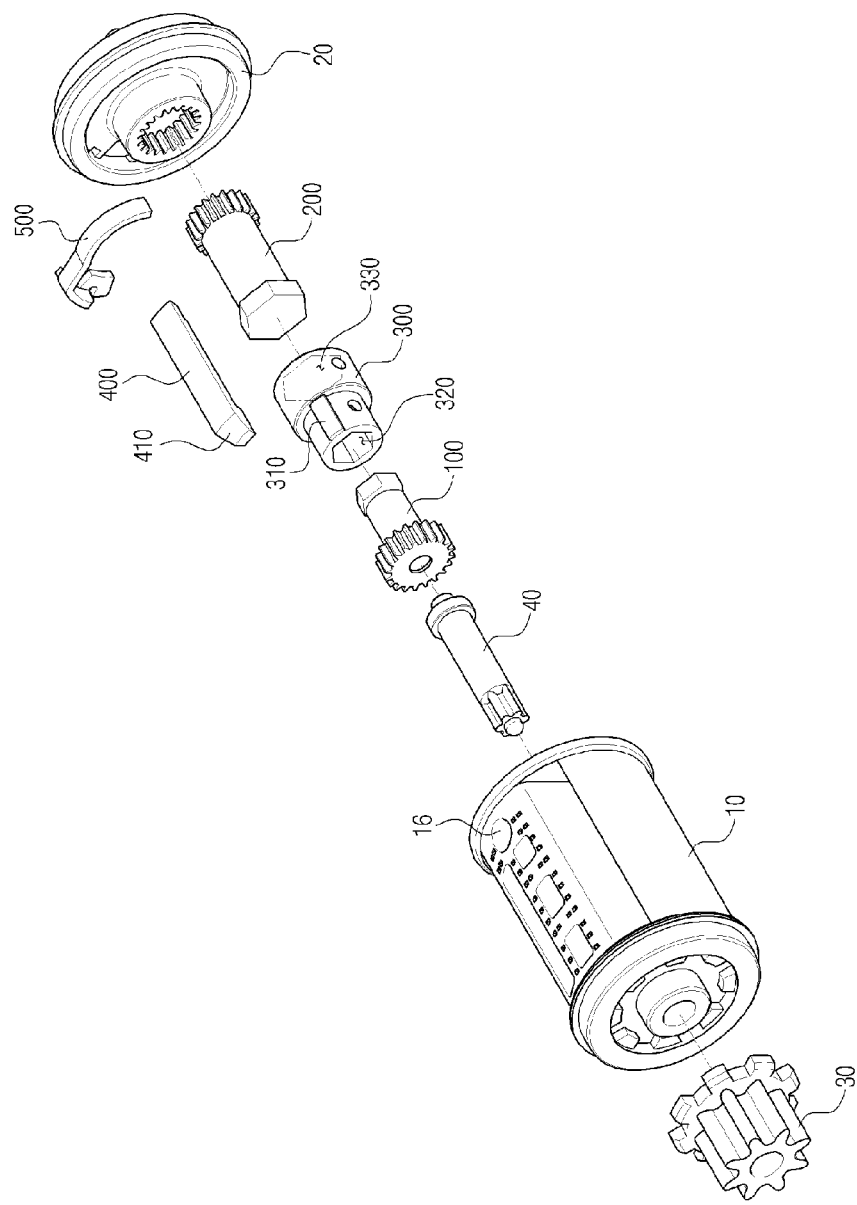
FIG. 2 is an exploded perspective view illustrating elements of the load limiter according to the embodiment of the present invention.
Figure 3:
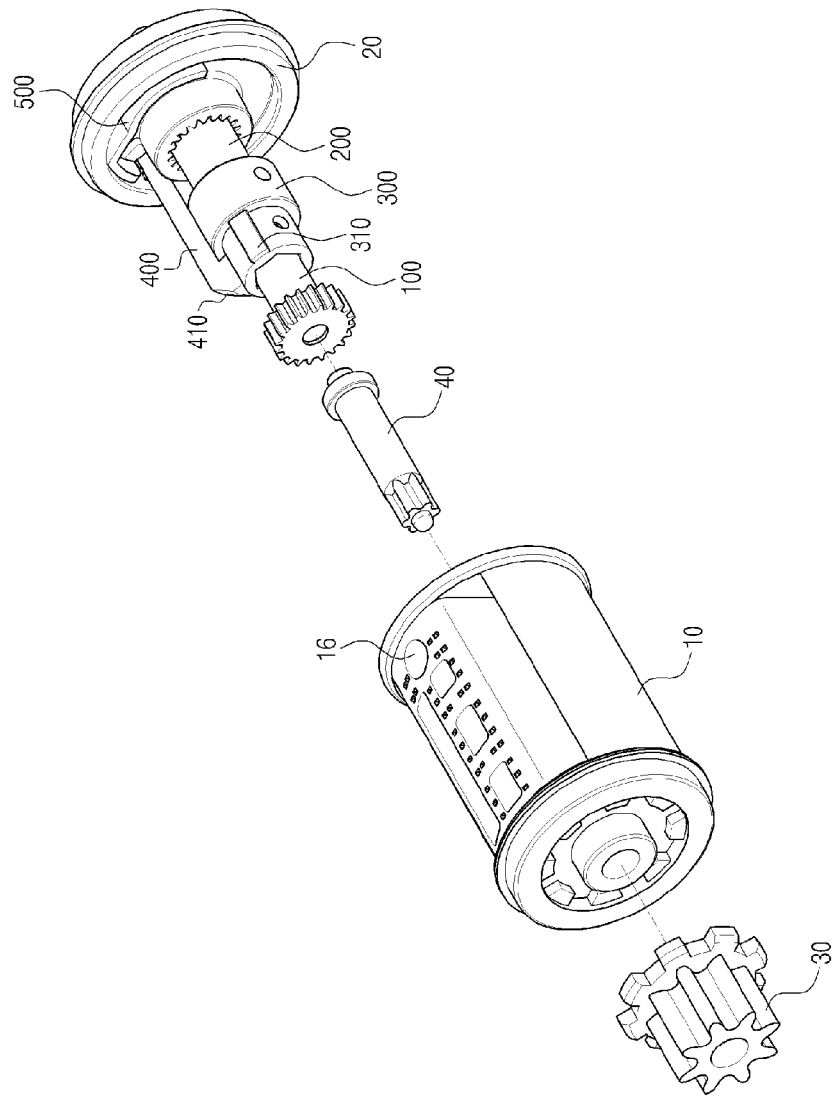
FIG. 3 is a partially exploded perspective view illustrating a state where some elements of the load limiter according to the embodiment of the present invention are assembled, considering a process of manufacturing the load limiter.
Figure 6:
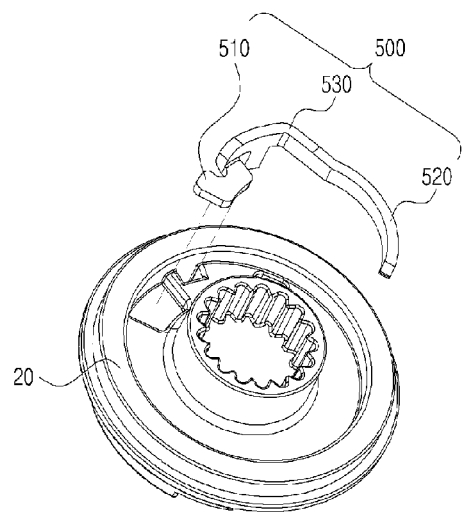
FIG. 6 is a perspective view illustrating a step where a deformable member of the load limiter according to the embodiment of the present invention is coupled to a locker.

First, a load limiter according to the present invention will be described with reference to FIGS. 1 to 3 and 6. Here, FIG. 1 is a partially-cutaway perspective view illustrating a load limiter according to an embodiment of the present invention. FIG. 2 is an exploded perspective view illustrating elements of the load limiter according to the embodiment of the present invention. FIG. 3 is a partially exploded perspective view illustrating a state where some elements of the load limiter according to the embodiment of the present invention are assembled, considering a process of manufacturing the load limiter. FIG. 6 is a perspective view illustrating a step where a deformable member of the load limiter according to the embodiment of the present invention is coupled to a locker.

As illustrated in FIGS. 1 to 3 and 6, the load limiter according to the embodiment of the present invention may include a first torsion bar 100 and a second torsion bar 200.

The first torsion bar 100 and the second torsion bar 200 are installed in a hollow portion 12 formed at a center of a cylindrical spool 10 on which a webbing (not shown) is wound, and serve to constrain a load applied to the webbing (not shown) from exceeding a preset load when one end of the spool 10 is rotated as the webbing (not shown) continues to be extracted and an opposite end of the spool 10 is fixed due to a locking operation of a locker 20.

In more detail, the first torsion bar 100 may be a cylindrical member having a torsion load limit of approximately 2.5 kN and may be inserted into the hollow portion 12 of the spool 10. One end of the first torsion bar 100 may have a shape corresponding to a polygonal recess (not shown) formed at one end of the spool 10 and may be inserted into the recess (not shown) and firmly coupled to the spool 10. An opposite end of the first torsion bar 100 may be connected to the second torsion bar 200, and may be connected through an adapter 300 as a connection medium body which will be described later.

Meanwhile, the second torsion bar 200 may be a cylindrical member having a torsion load limit higher than that of the first torsion bar 100, e.g. a torsion load limit of 5.0 kN, and may be inserted into the hollow portion 12 of the spool 10 together with the first torsion bar 100. As will be described later, one end of the second torsion bar 200 may be connected through the adapter 300 as a connection medium body. An opposite end of the second torsion bar 200 may be coupled to the locker 20 installed at an opposite end of the spool 10. Then, the opposite end of the second torsion bar 200 may be coupled to the locker 20 in a similar way in which the first torsion bar is coupled to the one end of the spool 10.

With the first torsion bar 100 and the second torsion bar 200, when one end of the spool 10 is rotated as the webbing (not shown) continues to be extracted and an opposite end of the spool 10 is fixed due to a locking operation of the locker 200, the first torsion bar 100 reaches a torsion load limit first to be twisted and then the second torsion bar 200 reaches a torsion load limit to be twisted.

In this way, as the first torsion bar 100 and the second torsion bar 200 having different torsion load limits together serve to constrain a load applied to the webbing (not shown) from exceeding a preset load, the above-mentioned function can be regulated in two steps.

That is, when a vehicle employing the seatbelt to which the load limiter according to the embodiment of the present invention collides, an opposite end of the spool 10 is locked so as not to be further rotated by the locker 20 so that the webbing (not shown) of the seatbelt surrounding a passenger can not be freely extracted to prevent the passenger from being separated from the seat.

However, a load is applied in a direction in which the webbing (not shown) is extracted due to an inertial force applied to the passenger, and accordingly, one end of the spool 10 having no locker 20 is rotated as the webbing (not shown) continues to be extracted.

In this way, since one end of the spool 10 continues to be rotated and an opposite end of the spool 10 is fixed, both a torsion load of the first torsion bar 100 and a torsion load of the second torsion bar 200 increase as a load applied to the webbing (not shown) increases.

Then, since a torsion load limit of the first torsion bar 100 is smaller than a torsion load limit of the second torsion bar 200, a load applied to the webbing (not shown) can be constrained from exceeding a preset load through a first step S1 of constraining a load applied to the webbing (not shown) from exceeding a first set load when the first torsion bar 100 reaches a torsion load limit to be twisted, and a second step S2 of constraining a load applied to the webbing (not shown) from exceeding a second set load when the second torsion bar 200 reaches a torsion load limit to be twisted Here, a preset load acts between a passenger and a webbing (not shown), and is allowed to constrain the webbing (not shown) so that the passenger cannot be separated from a seat.

The preset load may be classified into a first set load and a second set load depending on an operation of the load limiter according to the embodiment of the present invention. Then, the first set load is a load lower than the second set load, and refers to a load high enough to prevent a strong impact from being applied to a passenger while constraining a webbing (not shown) so that the passenger cannot be separated from a seat. Meanwhile, the second set load is a load higher than the first set load, and refers to a load sufficiently high enough to restrain a passenger from colliding with a vehicle structure installed on a front side of the passenger after an initial step of a collision of the vehicle. The load limiter including the first torsion bar 100 and the second torsion bar 200 according to the embodiment of the present invention may further include an adapter 300 which is a connection medium body for connecting the first torsion bar 100 and the second torsion bar 200, a stopper 400 for helping regulate a load applied to a webbing (not shown) in two steps through the first torsion bar 100 and the second torsion bar 200, together with the adapter 300, a deformable member 500 for regulating a load applied to the webbing (not shown) together with the first torsion bar 100 and the second torsion bar 200.

In more detail, the adapter 300 may have a cylindrical shape, considering that the first torsion bar 100 and the second torsion bar 200 will be inserted into the hollow portion 12 of the spool 10.

A first recess 320 into which an opposite end of the first torsion bar 100 can be inserted to be fixed may be formed at one side of the adapter 300, and a second recess 330 into which one end of the second torsion bar 200 can be inserted to be fixed may be formed at an opposite side of the adapter 300. That is, the adapter 300 is configured such that the first torsion bar 100 and the second torsion bar 200 can be inserted into the first recess 320 and the second recess 320 respectively.

Then, it is apparent that the shapes of the first recess 320 and the second recess 330 should correspond to the shapes of the opposite end of the first torsion bar 100 and the one end of the second torsion bar 200 respectively.

However, when the opposite end of the first torsion bar 100 and the one end of the second torsion bar 200, and the cross-sections of the first recess 320 and the second recess 330 are circular, the first torsion bar 100 and the second torsion bar 200 are not twisted but idle about the adapter 300, so they may fail to constrain a load applied to a webbing (not shown) from exceeding a preset load.

Thus, it would be advantageous to form the opposite end of the first torsion bar 100 and the one end of the second torsion bar 200, and the first recess 320 and the second recess 330 to have polygonal shapes each having inner angles, and it can be seen in the drawings that they have hexagonal column-like shapes.

Meanwhile, a catching boss 310 may be formed to be used to regulate a load applied to the webbing (not shown) over two steps through the first torsion bar 100 and the second torsion bar 200 together with the below-described stopper 400.

Then, the catching boss 310 protrudes from an outer peripheral surface of the adapter 300, and may have any shape and structure if it can catch one bent end 410 of the below-described stopper 400.

However, as an example for a further description of the embodiment illustrated in the drawings, as an outer surface of the adapter 300 adjacent to the one side thereof is recessed and stepped along a path where the below-described stopper 400 is rotated, the catching boss 310 may be formed on an outer peripheral surface of the adapter 300 where the stopper 400 is not rotated.

With the catching boss 310 simply protruding on an outer peripheral surface of the adapter 300, a bothersome procedure of drawing an imaginary outer surface with reference to one point of the catching boss 310 protruding from the highest part and checking whether the catching boss 300 can be inserted into the hollow portion 12 could be omitted.

Meanwhile, the stopper 400 has one bent end 410 and is mounted to an inner peripheral surface of the spool 10, and its shape and structure are not limited as long as it acts as described below. However, as will be described below, when one assembly including the first torsion bar 100, the second torsion bar 200, the adapter 300, the deformable member 500, and the locker 20 is inserted into the spool 10 to manufacture the load limiter according to the embodiment of the present invention, it can be advantageous if the stopper has a bar-like shape crossing between the one end and an opposite end of the spool 10, i.e. in a lengthwise direction of the spool 10.

As mentioned above, when one end of the spool 10 is rotated as the webbing (not shown) continues to be extracted and an opposite end of the spool 10 is fixed due to a locking operation of the locker 20, the stopper 400 configured in this way is rotated along an outer peripheral surface of the adapter 300 until the bent end 410 of the stopper 400 is caught by the catching boss 310.

That is, while one end 410 of the stopper 400 is disposed on one side of the catching boss 310 before one end of the spool 10 is rotated and an opposite end of the spool 10 is locked to be fixed, it is rotated along an outer peripheral surface of the adapter 300 during the above-described first step S1, is disposed at an opposite side to the one side of the catching boss 310 if the first step S1 is completed, and is rotated together with the adapter 300 while contacting the opposite side of the catching boss 310, i.e. being caught by the catching boss 310 during the second step S2.

As one end 410 of the stopper 400 is rotated along an outer peripheral surface of the adapter 300 until it is caught by the catching boss 310, the first torsion bar 100 and the second torsion bar 200 can help constrain a load applied to the webbing (not shown) from exceeding a preset load over two steps.

In more detail, the stopper 400 serves to directly transfer a rotating force of the spool 10 to the second torsion bar 200 when the first torsion bar 100 is twisted and a torsion load of the second torsion bar 200 increases. This can prevent a torsion which can be continuously generated in the first torsion bar 100 and the second torsion bar 200 due to the adapter 300 from being temporarily interrupted.

Meanwhile, a distance (angle) by which one end 410 of the stopper 400 is rotated from one side of the catching boss 310 to an opposite side of the catching boss 310 may be varied according to a torsion load limit of the first torsion bar 100 and a torsion load limit of the second torsion bar 200.

For example, as described above, if a torsion load limit of the first torsion bar 100 is 2.5 kN and a torsion load limit of the second torsion bar 200 is 5.0 kN, a distance by which one end 410 of the stopper 400 is rotated about a central axis of the adapter 300 along an outer peripheral surface of the adapter 300 may be 270 to 330 degrees, and preferably 300 degrees.

Meanwhile, the deformable member 500 is mounted to one surface of the locker 20 opposed to the opposite end of the spool 10, and may be mounted only if it is necessary to increase an initial load of the above-described first set load.

That is, as described above, after one end of the spool 10 is rotated as the webbing (not shown) continues to be extracted and an opposite end of the spool 10 is fixed due to a locking operation of the locker 20, as the deformable member 500 is deformed separately from an operation of the first torsion bar 100, it constrains a load applied to the webbing (not shown) from exceeding a preset load even if an initial load of a first set load increases.

Figure 10:
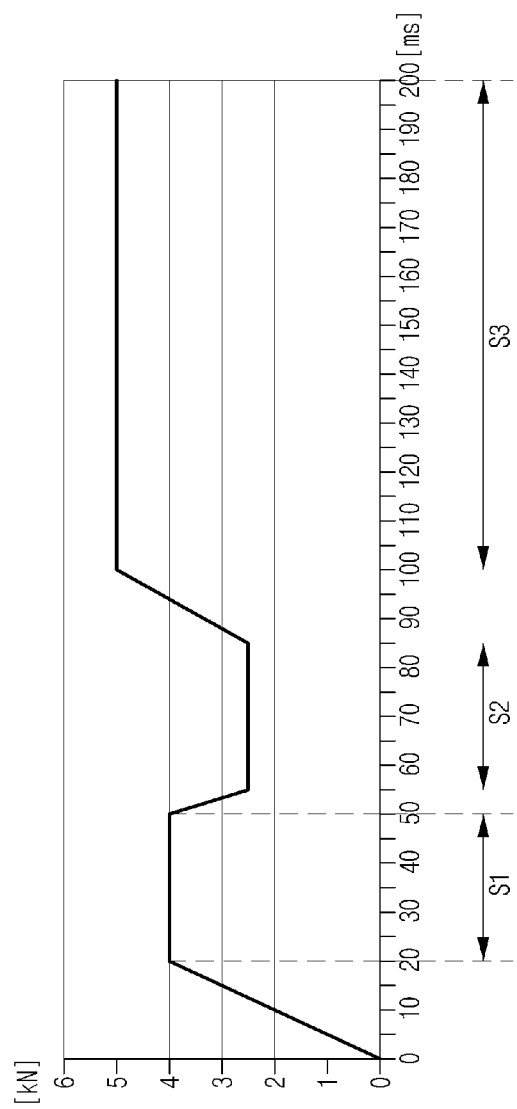
FIG. 10 is a graph illustrating a load applied to a webbing which varies with time through an operation of a load limiter (including a deformable member) according to another embodiment of the present invention.

That is, as the load limiter according to the embodiment of the present invention additionally includes the deformable member 500, an auxiliary load may be added to the present load (first set load) as illustrated in FIG. 10.

The deformable member 500 is applied in a way similar to a load form constituting a conventional digressive load limiter to constrain a load applied to the webbing (not shown) from exceeding a preset load.

The above-mentioned deformable member 500 may have various structures whose shapes can be deformed. However, for a detailed description of the deformable member 500, the deformable member 500 as illustrated in FIG. 6 will be described as an example.

That is, as illustrated in FIG. 6, the deformable member 500 may be a C-shaped member, in which case one end of the deformable member 500 is a fixed end mounted and fixed to one surface of the locker 20 and an opposite end of the deformable member 500 is a free end disposed on one surface of the locker 20 so as not to be fixed and being relatively movable along a guide groove 14 formed at an opposite end of the spool 10. A bending portion 530 may be formed between one end 510 and an opposite end 520 of the deformable member 500, in which case when the guide groove 14 passes from the one end 510 of the deformable member 500 via the opposite end 520 of the deformable member 500 as the spool 10 is rotated, the bending portion 530 may be deformed to be spread out gently.

In this way, with a deforming force created while the bending portion 530 of the deformable member 500 passes the guide groove 14 of the spool 10 to be spread out gently, as described above, a load applied to the webbing (not shown) can be constrained from exceeding a preset load even when an auxiliary load is added to a preset load (first set load). As a result, a deforming load can be regulated complexly in a load applied to the webbing (not shown) by the load limiter according to the embodiment of the present invention.

Meanwhile, other configurations and mutual relations between the above-described elements of the load limiter according to the embodiment of the present invention will be additionally described as follows.

As illustrated in FIG. 1, the locker 20 is locked by a retractor (not shown) to be fixed without being rotated. The spool 10 may have a cylindrical shape to be wound on the webbing (not shown), and is connected to the locker 20.

The above-configured spool 10 and locker 20 are operated as follows when the webbing (not shown) is extracted. First, if the webbing (not shown) is extracted, the spool 10 is rotated while the locker 20 is fixed, and the deformable member 500 and the first torsion bar 100 are operated due to rotation of the spools 10. Accordingly, a tensile force generated in the webbing (not shown) is regulated in specific rotation sections. Further, if rotation of the first torsion bar 100 having a relatively low load is completed, the second torsion bar 200 having a relatively high load is rotated to regulate a tensile force of the webbing (not shown). Then, a rotation degree of the first torsion bar 100 is determined by the spool 10, the adapter 300, the stopper 400, etc.

An overall operation of the load limiter according to the embodiment of the present invention including the elements having the mutual relations will be described in more detail herein below.

Meanwhile, the above-configured load limiter according to the embodiment of the present invention will be manufactured as follows.

First, the second torsion bar 200 is coupled to the locker 20 to which the deformable member 500 is mounted, and an assembly where the first torsion bar 100 is connected to the second torsion bar 200 can be manufactured by using the adapter 300 as a connection medium body.

After the assembly is manufactured in this way, the assembly is inserted into the hollow portion of the spool 10 and one end of the spool 10 is caulked to couple the first torsion bar 100 to the one end of the spool 10, so that the load limiter according to the embodiment of the present invention is manufactured.

Then, caulking refers to a widely used machining method for pressing two or more members to attach them, and is used to press a caulking point 16 disposed near one end of the spool to sealingly couple the torsion bar 100 to one end of the spool 10.

Meanwhile, the stopper 400 may be inserted and mounted into the hollow portion 12 of the spool 10 in advance before the above-described assembly is inserted into the hollow portion 12 of the spool 10, or may be pre-assembled in the above-described assembly to be inserted and mounted into the hollow portion 12 of the spool 10 together with the assembly. Then, the pre-assembled state refers to a state where the stopper 400 is disposed without using any special connecting member.

The load limiter according to the embodiment of the present invention is manufactured in this way to allow a conventionally manufactured spool to be easily used. That is, if the load limiter according to the embodiment of the present invention is manufactured in this way, only some processes can be changed to manufacture the conventional load limiter.

Figure 4:
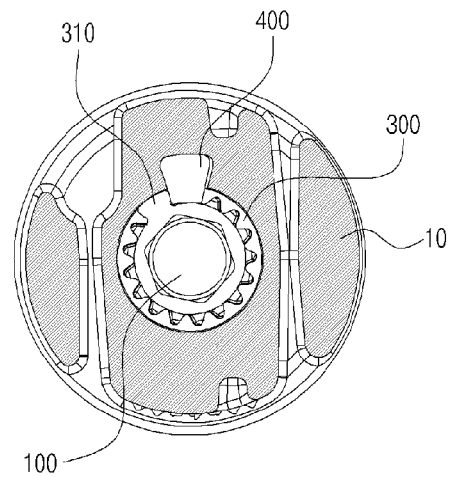
FIGS. 4 and 5 are sectional views taken in a direction perpendicular to a rotary shaft of a spool to explain an operation of the load limiter according to the embodiment of the present invention.
Figure 5:
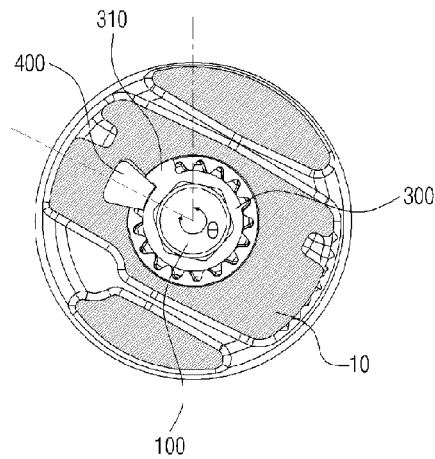
Figure 7:
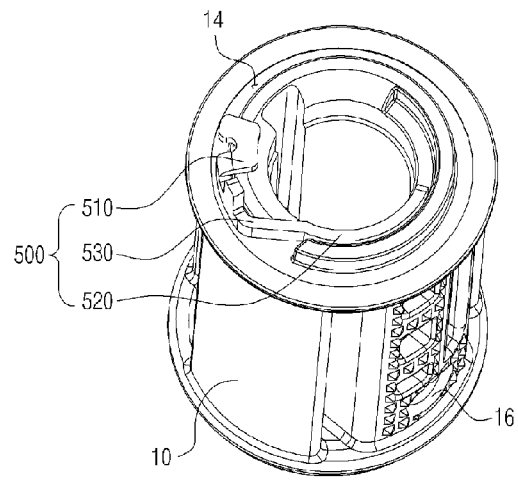
FIGS. 7 and 8 are perspective views illustrating only a spool and a deformable member to explain a process of the deformable member being deformed in the load limiter according to the embodiment of the present invention.
Figure 8:
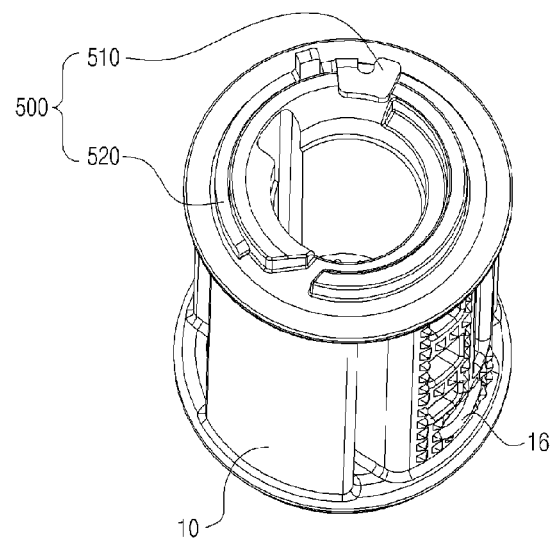
Figure 9:
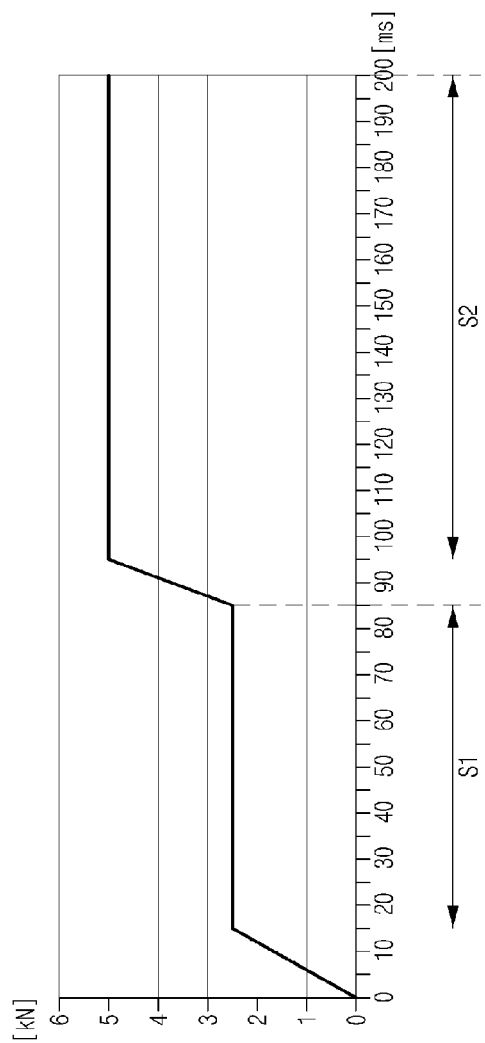
FIG. 9 is a graph illustrating a load applied to a webbing which varies with time through an operation of the load limiter according to the embodiment of the present invention.

Hereinafter, an operation of the load limiter according to the embodiment of the present invention will be described with reference to FIGS. 4, 5, and 7 to 10. Here, FIGS. 4 and 5 are sectional views taken in a direction perpendicular to a rotary shaft of a spool to explain an operation of the load limiter according to the embodiment of the present invention. FIGS. 7 and 8 are perspective views illustrating only a spool and a deformable member to explain a process of the deformable member being deformed in the load limiter according to the embodiment of the present invention. FIG. 9 is a graph illustrating a load applied to a webbing which varies with time through an operation of the load limiter according to the embodiment of the present invention. FIG. 10 is a graph illustrating a load applied to a webbing which varies with time through an operation of a load limiter (including a deformable member) according to another embodiment of the present invention.

As described above, when a vehicle employing a seatbelt including the load limiter according to the embodiment of the present invention collides, the opposite end of the spool 10 is locked by the locker 20 so as not to be rotated further, and the one end of the spool 10 is rotated as the webbing (not shown) continues to be extracted due to an inertial force applied to a passenger in case of a load higher than the torsion loads of the torsion bars 100 and 200.

If one end of the spool 100 is rotated as the webbing (not shown) continues to be extracted and an opposite end of the spool 10 is fixed due to a locking operation of the locker 20, a load interacting between a passenger and the webbing (not shown), i.e. a load applied to the wedding (not shown) increases continuously, injuring the passenger.

Thus, the first torsion bar 100 and the second torsion bar 200 are sequentially distorted due to their loads so that a load applied to the webbing (not shown) cannot exceed a preset load, preventing injury of the passenger.

In more detail, referring to the graph of FIG. 9, although a torsion load is applied to the first torsion bar 100 until a time point of 15 ms, the first torsion bar 100 is not twisted.

However, if a load applied to the webbing (not shown) continues to increase, a torsion load applied to the first torsion bar 100 also increases to exceed 2.5 kN which is a torsion load limit of the first torsion bar 100 at a time point of 15 ms, so the first torsion bar 100 is twisted up to a time point of 85 ms (it corresponds to a section S1 of FIG. 9).

While the first torsion bar 100 is twisted, the stopper 100 located on one side of the catching boss 310 is rotated as illustrated in FIG. 4, is located on an opposite side of the catching boss 310 as illustrated in FIG. 5, and is caught by the opposite side of the catching boss 310 to be rotated together with the catching boss 310 continuously from a time point of 85 ms.

Meanwhile, a torsion load is applied to the second torsion bar 200 from 85 ms to 95 ms when the stopper 400 is caught by the catching boss 310 to be rotated together with the catching boss 310.

However, if a load applied to the webbing (not shown) continues to increase, a torsion load applied to the second torsion bar 200 increases similar to the first torsion bar 100, and exceeds 5.0 kN which is a torsion load limit of the second torsion bar 200 at a time point of 95 ms and is then twisted until a specific time point (it corresponds to a section S2 of FIG. 9).

As described above, in the load limiter according to the embodiment of the present invention, a load applied to the webbing (not shown) can be constrained from exceeding a first set load (corresponding to 2.5 kN of FIG. 9) and a second set load (corresponding to 5.0 kN of FIG. 9) through a step S1 where the first torsion bar 100 is twisted and a step S2 where the second torsion bar 200 is twisted.

Thus, when one end of the spool 10 is rotated as the webbing (not shown) continues to be extracted and an opposite end of the spool 10 is fixed due to a locking operation of the locker 20, since a load applied to the webbing (not shown) first is constrained from exceeding a first set load, the webbing (not shown) can be constrained so that a weak passenger such as an old person cannot be separated from the seat and will not be injured.

Meanwhile, as illustrated in FIG. 10, when an initial load of the first set load increases, the deformable member 500 can be additionally installed if an auxiliary load is intended to be added to the first set load.

That is, after one end of the spool 10 is rotated as the webbing (not shown) continues to be extracted and an opposite end of the spool 10 is fixed due to a locking operation of the locker 20, when the first torsion bar 100 is twisted, the deformable member 500 disposed as in FIG. 7 is moved relative to the guide groove 14 formed at the one end of the spool 10 as illustrated in FIG. 8.

Then, the bending portion 530 of the deformable member 500 is gently spread out along the guide groove 14, and a force required to spread out the bending portion 530 may be illustrated as a part of a load applied to the webbing (not shown) (it corresponds to a section S1 of FIG. 10). That is, in the section S1 of FIG. 10, the first torsion bar 100 is twisted and the deformable member 500 is deformed at the same time.

Thereafter, if the deformable member 500 is completely deformed, i.e. if the bending portion 530 is spread out completely, since the load applied to the webbing (not shown) is not influenced, the load applied to the webbing (not shown) decreases. However, since the first torsion bar 100 continues to be twisted, the load applied to the webbing (not shown) does not increase, causing an operation the same as that of the section S1 of FIG. 9 (it corresponds to the section S2 of FIG. 10).

Moreover, since the deformable member 500 is not operated further, the proceeding operation is the same as the operation of the load limiter according to the present invention in the section S2 of FIG. 9, whereby a load applied to a webbing can be constrained from exceeding a preset load through two or more steps.

According to the load limiter according to the embodiment of the present invention where the deformable member 500 described with reference to FIG. 10 is added, a load is complexly applied to the first set load due to the first torsion bar 100 by a load required to gently spread out the bending portion 530 of the deformable member 500 while the bending portion 530 passes through the guide groove 14. Thus, a load can be regulated through three steps S1 to S3 differently as in the load limiter according to the embodiment of the present invention described with reference to FIG. 9.

Although a specific embodiment of the present invention has been described and illustrated, it will be understood by those skilled in the art to which the present invention pertains that the present invention is not limited to the embodiment but various variations and modification can be made without departing from the spirit and scope of the present invention. Accordingly, the variations and modification should not be construed separately from the technical spirit or aspect of the present invention, and the modified embodiments also pertain to the scope of the present invention which is recited in the claims.

The invention claimed is:

1. A load limiter mounted within a cylindrical spool on which a webbing is wound, the load limiter constraining a load applied to the webbing from exceeding a preset load, and comprising:
   a first torsion bar inserted into a hollow portion formed at a center of the spool, and having one end of the first torsion bar coupled to one end of the spool;
   a second torsion bar inserted into the hollow portion of the spool together with the first torsion bar, wherein one end of the second torsion bar is connected to the other end of the first torsion bar and the other end thereof is coupled to a locker, and the first torsion bar and the second torsion bar are configured such that a torsion load limit of the first torsion bar is smaller than a torsion load limit of the second torsion bar;
   an adapter acting as a cylindrical connection medium body for connecting the other end of the first torsion bar and the one end of the second torsion bar and having a catching boss protruding from an outer peripheral surface thereof; and
   a stopper mounted on an inner peripheral surface of the spool, one end of the stopper bent toward the outer peripheral surface of the adaptor,
   wherein, when the webbing continues to be withdrawn, the load applied by the webbing is constrained not to exceed the torsion load limit of the first torsion bar, and
   wherein, upon reaching the torsion load limit of the first torsion bar, the first torsion bar is twisted, the spool is rotated by the first torsion bar, and the stopper is rotated along the outer peripheral surface of the adapter until the one end of the stopper is caught by the catching boss of the adaptor,
   wherein, after the one end of the stopper is caught by the catching boss, the load applied by the webbing is constrained not to exceed the torsion load limit of the second torsion bar, and then the second torsion bar is twisted upon reaching the torsion load limit of the second torsion bar, and
   wherein the twisting of the second torsion bar stops by a locking operation of the locker to which the other end of the second torsion bar is coupled, thereby stopping the rotation of the spool and then the drawing of the webbing.

2. The load limiter as claimed in claim 1, wherein the stopper is configured to rotate 270 to 330 degrees about a central axis of the adapter.

3. The load limiter as claimed in claim 1, wherein the adapter comprises a first recess into which the other end of the first torsion bar is inserted to be fixed at one side of the adapter, and a second recess into which the one end of the second torsion bar is inserted to be fixed at the other side of the adapter.

4. The load limiter as claimed in claim 3, wherein the first recess and the second recess have polygonal shapes corresponding to the other end of the first torsion bar and the one end of the second torsion bar.

5. The load limiter as claimed in claim 1, further comprising a C-shaped deformable member, one end of which is fixed to the locker and the other end of which is a free end, and including a bending portion in-between, the C-shaped deformable member being disposed inside a guide groove formed an inner surface of the spool, and the C-shaped deformable member adding an auxiliary load to the torsion load limit of the first torsion bar.

* * * * *